US010315927B2

(12) United States Patent
Zhao et al.

(10) Patent No.: US 10,315,927 B2
(45) Date of Patent: *Jun. 11, 2019

(54) METHODS AND PROCESSES OF PREPARING ALUMINUM HYDROXIDE AND ALUMINUM OXIDE

(71) Applicant: Shanghai Phichem Material Co. Ltd., Shanghai (CN)

(72) Inventors: Bing Zhao, Shanghai (CN); Yun Zhang, Shanghai (CN); Yinsheng Wang, Shangai (CN); Jinshan Zhang, Dublin, CA (US)

(73) Assignee: Shanghai Phichem Material Co. Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/112,352

(22) PCT Filed: Jan. 14, 2015

(86) PCT No.: PCT/US2015/011287
§ 371 (c)(1),
(2) Date: Jul. 18, 2016

(87) PCT Pub. No.: WO2015/108896
PCT Pub. Date: Jul. 23, 2015

(65) Prior Publication Data
US 2016/0332889 A1 Nov. 17, 2016

(30) Foreign Application Priority Data

Jan. 17, 2014 (CN) .......................... 2014 1 0022684

(51) Int. Cl.
| | | |
|---|---|---|
| *C01F 7/00* | (2006.01) | |
| *C01F 7/42* | (2006.01) | |
| *C04B 33/02* | (2006.01) | |
| *C01F 7/46* | (2006.01) | |
| *C04B 35/10* | (2006.01) | |
| *C04B 35/634* | (2006.01) | |

(52) U.S. Cl.
CPC ............... *C01F 7/428* (2013.01); *C01F 7/42* (2013.01); *C01F 7/46* (2013.01); *C04B 33/02* (2013.01); *C04B 33/025* (2013.01); *C04B 35/10* (2013.01); *C04B 35/634* (2013.01); *C01P 2006/10* (2013.01); *C01P 2006/80* (2013.01); *C04B 2235/6027* (2013.01); *C04B 2235/72* (2013.01); *C04B 2235/725* (2013.01); *C04B 2235/728* (2013.01); *C04B 2235/77* (2013.01)

(58) Field of Classification Search
CPC ...... C01F 7/42; C01F 7/44; C01F 7/46; C01P 2006/80; C04B 35/10
USPC ......................................... 423/625, 627, 629
See application file for complete search history.

(56) References Cited

U.S. PATENT DOCUMENTS

| | | | | |
|---|---|---|---|---|
| 2,838,444 A | * | 6/1958 | Gring ....................... | B01J 21/04 208/138 |
| 2,947,056 A | | 8/1960 | Csordas et al. | |
| 3,231,330 A | * | 1/1966 | Hauschild ............... | C01F 7/021 423/629 |
| 3,488,147 A | * | 1/1970 | Cornely ................... | C01F 7/428 423/627 |
| 3,494,733 A | * | 2/1970 | Cornely ................... | B01J 21/04 423/627 |
| 9,643,857 B2 | | 5/2017 | Zhao et al. | |
| 2012/0171450 A1 | | 7/2012 | Ozaki et al. | |

FOREIGN PATENT DOCUMENTS

| | | |
|---|---|---|
| CN | 1757767 A | 4/2006 |
| CN | 1903728 A | 1/2007 |
| CN | 101200298 A | 6/2008 |
| CN | 101913636 B | 12/2011 |
| CN | 103241756 A | 8/2013 |
| CN | 103523810 A | 1/2014 |
| CN | 104250017 A | 12/2014 |
| EP | 2119672 A1 | 11/2009 |
| FR | 1505350 A | 12/1967 |

OTHER PUBLICATIONS

Machine translation of CN-1903728 A, Jan. 31, 2007.*
Olszyna et al., "Sintering of High-Density, High-Purity ALumina Ceramics," Ceramics International (1997); 23:323-328.

* cited by examiner

*Primary Examiner* — Steven J Bos
(74) *Attorney, Agent, or Firm* — Fox Rothschild LLP

(57) ABSTRACT

A method for manufacturing high-purity aluminum hydroxide and alumina material is disclosed, which includes the steps of: reacting aluminum metal with a mixture of organic base and water to form aluminum hydroxide suspension; removing water by filtration to form aluminum hydroxide slurry, and for manufacturing alumina material, further drying/baking the slurry to form aluminum oxide powders. The method is amenable to mass production of high-purity aluminum hydroxide and aluminum oxide containing total silica and non-aluminum metal impurities less than 0.005% and having a bulk density higher than 3.0 g/cc. In addition, the invention also provides high-purity aluminum hydroxide and aluminum oxide prepared by using the method disclosed and bulk products prepared therefrom.

19 Claims, 1 Drawing Sheet

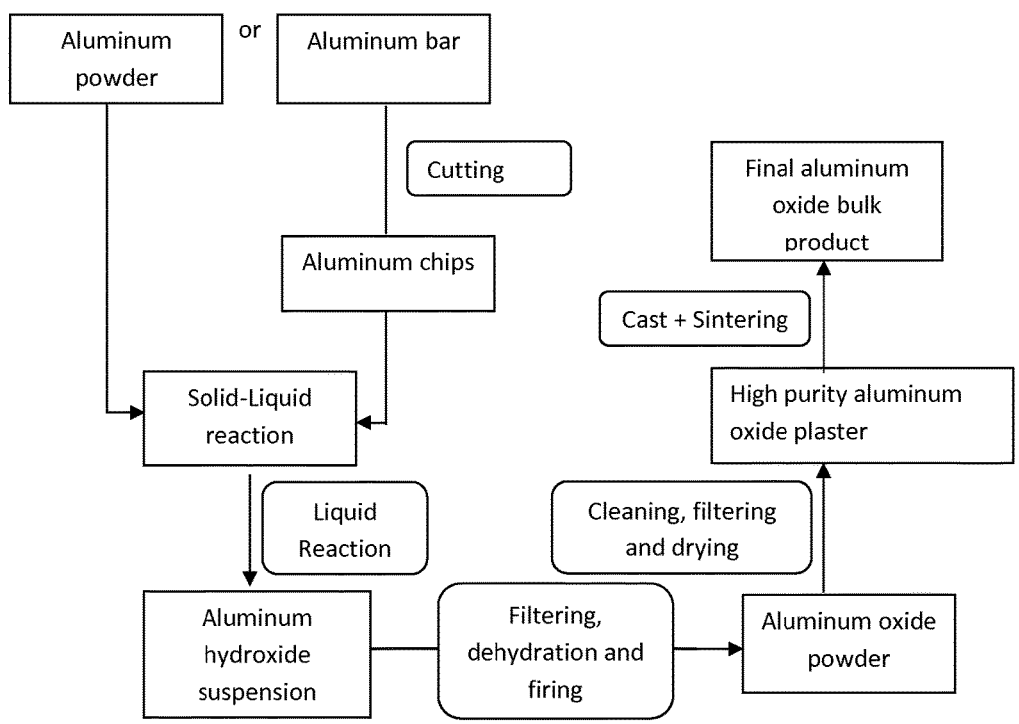

METHODS AND PROCESSES OF PREPARING ALUMINUM HYDROXIDE AND ALUMINUM OXIDE

CROSS-REFERENCE TO RELATED APPLICATIONS

This application is a U.S. national phase application of International Application No. PCT/US2015/011287, filed Jan. 14, 2015, which in turn claims benefits of Chinese Patent Application No. 201410022684.5, filed on Jan. 17, 2014, both of which are hereby incorporated by reference in their entirety.

FIELD OF THE INVENTION

The present invention relates to methods and processes for preparing aluminum oxide as well high purity aluminum oxide and products prepared therefrom.

BACKGROUND OF THE INVENTION

Most of LED substrates are now made from sapphire single crystal boules through cutting, grinding, oriental sectioning and polishing single crystal sapphire boules. Recently, sapphire single crystal has also found wide applications in smart phones, tablet computers, and other consumer electronic devices. High purity aluminum oxide is the most important precursor for sapphire singe crystal growth.

The sapphire single crystal is produced from aluminum oxide melts at high temperature. Popular methods for sapphire growth include Czochralski method, Edge-defined Film-fed Growth, Vertical Gradient Freeze method, Kyropoulos method, and the like.

Defects inside a sapphire crystal often include dislocations, bubbles, inclusions and cracks. These defects can cause absorption, scattering, reflection or diffraction of photons, phonons or other electromagnetic energy, and can therefore reduce the overall quality of sapphire substrates. Consequently, these defects can significantly impact the performance of LEDs made from the substrates with these types of defects. Furthermore, these defects can also result in discoloring of the sapphire crystal. The formation of defects in the sapphire crystal growth is believed to be due to high level of impurities, especially high metal contents in the aluminum oxide raw material. Therefore, it is often recommended to control overall metal contents, as well as silicon impurity, within less than 0.005% in the aluminum oxide raw material for high quality sapphire crystal manufacturing.

In addition, if the aluminum oxide powder is used as a raw material for sapphire crystal growth, the issues also include dusting during packing process and low batch quantity of the raw material. Because the sapphire growth is a batch process, low packing quantity can reduce the manufacturing efficiency, and therefore impact the overall sapphire growth capability and cost control. For the aluminum oxide raw material currently used in the sapphire growth process, overcoming the two major issues, i.e., high metal and silicon contents and low packing quantity, is highly desirable.

SUMMARY OF THE INVENTION

The present invention provides a new method for preparing high quality aluminum oxide that overcomes the foregoing issues.

In one aspect the present invention provides a method comprising the following steps:
 a) reacting aluminum metal with an organic base in water to form an aluminum hydroxide suspension;
 b) removing most of water content by filtration to form an aluminum hydroxide cake, and drying and firing the cake to convert the aluminum hydroxide into aluminum oxide powder;
 c) rinsing and purifying aluminum oxide powder, and separating aluminum oxide powder from water solution by filtering to form high purity aluminum oxide plaster; and
 d) optionally casting aluminum oxide plaster into a desired shape for dehydration and sintering at high temperature to form a solid bulk product.

In another aspect, the present invention provides high purity aluminum oxide prepared according to the methods or processes disclosed herein.

In another aspect, the present invention provides articles comprising high purity aluminum oxide prepared according to the methods or processes disclosed herein.

In another aspect, the present invention provides articles consisting of or consisting essentially of high purity aluminum oxide prepared according to the methods or processes disclosed herein.

The present invention offers various advantages for production of high purity aluminum oxide. For example, first, majority impurities are removed by letting aluminum metal directly react with an organic base solution, followed by filtering, baking and dehydration. Second, in particular, impurities are further reduced by adding complexing agent(s) to the reaction between the aluminum metal and the organic base. Third, the small amounts of remaining impurities on the surfaces of aluminum oxide particles are further washed out by rinsing with deionized water. In addition, by adding some binder(s) into the aluminum oxide plaster for casting, it is easier to form certain casting shapes for higher casting density.

Thus, the present invention has not only made it possible to obtain an aluminum oxide bulk product with density higher than 3.0 g/cc, sometimes even close to 4.0 g/cc, but also able to achieve the non-aluminum metal impurity level, including silicon, less than 0.005% by weight. The method of the present invention is especially useful for making high purity aluminum oxide suitable for efficient and high quality sapphire crystal growth.

These and other aspects or embodiments of the present invention will be better appreciated in view of the following drawing, detailed description and claims.

BRIEF EXPLANATION OF THE DRAWING

FIG. 1 illustrates a diagram of the process steps in one embodiment to make high purity aluminum oxide and its bulk product from a raw aluminum metal precursor.

DETAILED DESCRIPTION OF THE INVENTION

The present invention provides high purity aluminum oxide and methods and processes of preparing them. The method involves: reacting aluminum metal with a mixture of organic base and water to form an aluminum hydroxide suspension; removing molecular water and impurities dissolved in it by filtration to form an aluminum hydroxide wet cake, and drying the wet cake and dehydrating the dried aluminum hydroxide to form aluminum oxide powders; rinsing to further purify the aluminum oxide powders, and separating aluminum oxide powders from rinsing solution by filtration to form a high purity aluminum oxide plaster. The aluminum oxide plaster can be further casted into desired shape for dehydration and sintering at high temperature to form a solid bulk product. The new method can produce high quality aluminum oxide bulk material with total content of non-aluminum metal and silicon impurities less than 0.005% by weight, and overall bulk density higher than 3.0 gram per cubic centimeter (g/cc).

In one aspect the present invention provides a method of manufacturing aluminum oxide, comprising the steps of:

1) reacting an aluminum metal with an organic base in water in the presence of one or more complexing agents to form an aluminum hydroxide suspension;

2) removing liquid from the aluminum hydroxide suspension by filtration to obtain aluminum hydroxide, and drying and dehydrating aluminum hydroxide to obtain aluminum oxide powder; and 3) rinsing and purifying the aluminum oxide powder from the step 2), and filtering and deliquoring to obtain an aluminum oxide plaster, wherein said one or more complexing agents react with non-aluminum metal impurities in reactants of step 1) to form water soluble complexes for ease of removal in steps 2) and 3).

In one embodiment, the method further comprises a step of: 4) casting the aluminum oxide plaster into a desired shape and sintering at an elevated temperature to form an aluminum oxide product.

In one embodiment, sometimes preferably, the starting material aluminum metal has a purity of 99.95% or higher by weight.

In another embodiment, sometimes preferably, the starting material aluminum metal is in the form of chips or powder.

In another embodiment, sometimes preferably, the aluminum chips are less than 2 mm in thickness with a volume smaller than 6 cm$^3$.

In another embodiment, the complexing agent or agents are selected from organic and inorganic complexing agents and combinations thereof.

In another embodiment, the inorganic complexing agents are selected from HCl, NH4SCN, NH4F, NH3, polycyanic acid, polyisocyanates, pyrophosphates and polyphosphates.

In another embodiment, the organic complexing agents are selected from carboxylic acids, amino-carboxylic acids, hydroxyl amino carboxylic acids, alcohol amines, and polymers.

In another embodiment, said one or more complexing agents contain less than 10 ppm of non-aluminum metal impurities in total by weight.

In another embodiment, the organic base is a quaternary ammonium hydroxide having a molecular formula of $R_1R_2R_3R_4N^+OH^-$, wherein $R_1$, $R_2$, $R_3$, and $R_4$ are each independently selected from alkyl (preferably $C_1$-$C_4$ alkyl), aryl (preferably, phenyl), and arylalkyl (preferably benzyl), each optionally substituted by one or more substituents independently selected from hydroxyl and $C_1$-$C_4$ alkoxy.

In another embodiment, the organic base is selected from the group consisting of tetra-methyl ammonium hydroxide, tetra-ethyl ammonium hydroxide, tetra-propyl ammonium hydroxide, (2-hydroxyethyl) tri-methyl ammonium hydroxide, benzyl tri-methyl ammonium hydroxide, tri-methyl phenyl ammonium hydroxide, and combinations thereof.

In another embodiment, the organic base contains a total of less than 10 ppm of non-aluminum metal impurities by weight.

In another embodiment, the reaction temperature in step 1) is in the range of about 30° C. to about 99° C.

In another embodiment, the reaction components in step 1) have the following concentrations: about 1-20% for aluminum metal, about 0.01-10% for the organic base, and about 0.01-10% for the complexing agent by weight.

In another embodiment, said removing in step 2) comprises filtering the aluminum hydroxide suspension to obtain a filer cake, and washing and deliquoring the filter cake.

In another embodiment, said filtering is carried out on a plate-and-frame filter press, in a centrifuge, or in a bag filter, or a combination thereof.

In another embodiment, said washing is done by using deionized water with a mass ratio between the deionized water to the solid product in the range of about 1 to 50.

In another embodiment, said drying and dehydrating in step 2) comprise firing the filter cake inside a crucible at a temperature in the range of about 500 to 1400° C. for a period from about 0.5 to 100 hours or until the aluminum hydroxide cake is completely or substantially converted into aluminum oxide powder.

In another embodiment, said rinsing in step 3) comprises washing the aluminum oxide powder with a washing liquid, wherein the mass ratio of the washing solution to the aluminum oxide powder is in the range of about 1:1 to 50:1.

In another embodiment, the washing liquid is selected from the group consisting of deionized water, inorganic acid solutions, organic acid solutions, organic base solutions, non-metal cationic salt solutions, aliphatic hydrocarbons, aromatic hydrocarbons, alcohols, ketones, and combinations thereof.

In another embodiment, said purifying in step 3) comprises rinsing with one or more cleaning solutions.

In another embodiment, said drying in step 3) is selected from drying in a baking oven, drying in a toast-house, flash drying, and microwave drying, or a combination thereof.

In another embodiment, water content of said aluminum oxide plaster is in the range from about 1% to about 40% by weight.

In another embodiment, said casting comprises placing the aluminum oxide plaster in a pressure casting equipment to pressure-cast it into a desired bulk shape.

In another embodiment, the method further comprises mixing the aluminum oxide plaster with one or more binders prior to the casting in order to increase casting density of the product.

In another embodiment, the binders are selected from deionized water, polyethylene glycol, polyvinyl alcohol, polypropylene ethylene glycol, and combinations thereof.

In another embodiment, the total mass of the binder or binders added into the aluminum oxide plaster is between about 0.01% and about 10% of the total casting weight.

In another embodiment, the overall non-aluminum metal impurities in the binder or binders are less than 10 ppm by weight.

In another embodiment, said sintering comprises heating the aluminum oxide cast in a crucible or container at a temperature at or higher than 1450° C. to consolidate the aluminum oxide cast into a solid product.

In another embodiment, said sintering further comprises placing a buffer layer of aluminum oxide powder between the product and the crucible or the container to avoid the aluminum oxide cast in direct contact with the crucible.

In another embodiment, the aluminum oxide powder used as buffer has a purity level not lower than that of the targeted aluminum oxide product.

In another embodiment, the crucible or container is made from a material selected from alumina, mullite, cordierite, and combinations thereof.

In another embodiment, the crucible or container comprises a cover made from a material selected from alumina, mullite, cordierite, and combinations thereof.

In another embodiment, said sintering is conducted in an apparatus selected from muffle furnace, tunnel kiln and graphite oven.

In another embodiment, all equipment, piping, containers and tools involved in the process possible of contacting with aluminum hydroxide or aluminum oxide product or intermediate products are plated with a Teflon® coating to avoid contamination by impurities comprising metals other than aluminum.

In another aspect, the present invention provides an article comprising a high purity aluminum oxide prepared according to any embodiment disclosed herein.

In another aspect, the present invention provides an article consisting essentially of a high purity aluminum oxide prepared according to any embodiment disclosed herein.

In another aspect, the present invention provides an article consisting essentially of a high purity aluminum oxide prepared according to any embodiment disclosed herein. In some preferred embodiments, the article is directly casted from a high purity aluminum oxide plaster prepared according to any embodiment disclosed herein.

In the method disclosed, aluminum metal bars are used as the main starting material, which usually are very large, and do not have enough surface area to react with other reactants efficiently and effectively. In order to enhance the reaction between aluminum metal with the organic bases in water, it is preferably to cut the aluminum metal into small pieces with thickness less than 2 mm, and overall volume less than 6 cm$^3$. Alternatively, if aluminum metal powder is used as the starting material, there is no need to cut. However, regardless of the form or shape of the aluminum metal, its purity level is preferably higher than 99.95% by weight.

In some embodiments, one to two organic or inorganic complexing agents may be used to react with aluminum metal raw material. However, the metal impurity level excluding aluminum itself in the complexing agents is preferably less than 10 PPM by weight.

The inorganic complexing agents can be one of, or a combination of any following agents, including HCl, $NH_4SCN$, $NH_4F$, $NH_3$, poly-isocyanate, pyro-phosphate, and poly-phosphate. The organic complexing agents can be one of, or a combination of any following agents, including amino acid, hydroxyl amino carboxylic acid, carboxylic acid, alcohol amine, and high molecular polymers.

In a preferred embodiment, the organic complexing agent used in this invention is quaternary ammonium base, having a general molecular formula of $R_1R_2R_3R_4N^+OH$, wherein $R_1$, $R_2$, $R_3$, and $R_4$ can be, but not necessarily, same kind of aliphatic or aromatic hydrocarbon radicals. The metal impurity level excluding aluminum in this organic complexing agent is preferably less than 10 ppm by weight.

More preferably, the selected organic base is one or a mix of any of: 4-methyl ammonium hydroxide, 4-ethyl ammonium hydroxide, 4-propyl ammonium hydroxide, (2-hydroxyethyl) 3-methyl ammonium hydroxide, benzyl trimethyl ammonium hydroxide and 4-methyl phenyl hydroxide.

In one embodiment, reactants are 1-20% aluminum metal, 0.01-10% organic base, and 0.01-10% complexing agent by weight, respectively. The rest is deionized water. The typical reaction temperature is between 30 and 99° C., with the duration from 1 to 100 hours.

In one embodiment, the separation of aluminum hydroxide from the aqueous solution includes filtering, washing and air blowing. Specifically, the separation is done by using plate-and-frame filter press, centrifuge or bag filter.

In one embodiment, the washing is done by adding deionized water into the filtering process to remove residual organic bases and complexing agents. The typical mass ratio of the deionized water to the aluminum hydroxide is between 1:1 and 50:1.

In one embodiment, most of the remaining water in the aluminum hydroxide slurry is blown off by filtered pressed air.

In one embodiment, to convert the aluminum hydroxide cake into aluminum oxide powder, the cake is placed into a container to be heated up to a temperature between 500 and 1400° C. for a period from 0.5 to 100 hours.

To avoid potential contamination during heating process, in some embodiments, it is preferred to have a cover for the container.

The aluminum oxide powder is further purified by rinsing with cleaning solution(s), including but not limited to (1) deionized water; (2) inorganic acid solution; (3) organic acid solution; (4) organic base solution; (5) non-metal cationic ion salt solution, (6) one or a mixture of several aromatic hydrocarbons; or (7) a mixture of any of (1) to (6). The rinsing process can be repeated up to 500 times with one cleaning solution or different cleaning solutions alternatively.

Preferably, the drying method described in step c) used in this application includes one or multiple drying equipment of baking oven, drying room, flashing drying or/and microwave drying equipment.

Preferably, the water content in the highly purified aluminum oxide plaster described in step c) is typically between 1% and 40% by weight.

In some embodiments, a small amount of binder or binders is added into the aluminum oxide plaster before casting. The binders include one or a mix of any of the deionized water, polyethylene glycol, polyvinyl alcohol, and low molecular weight polypropylene glycol. Again, the metal content in the binder except aluminum element is preferably less than 10 ppm by weight.

Casting machines used to obtain certain desired shape for the aluminum oxide plaster include cookie presser, tablet presser, granulating machine, micro pill machine, and coating machine. The casted aluminum oxide plaster is called as cookies at this point.

In one embodiment the sintering process to solidify aluminum oxide cookies into a bulk product is done at a temperature at or higher than 1450° C. for a period of time, for example, from about 0.2 hour up to 100 hours in a furnace. Typically, the aluminum oxide cookies are placed inside a crucible, or another high temperature resistant container, sometimes with a cover to avoid potential contamination. The crucible or container materials can be alumina, mullite or cordierite. Further precaution is taken by placing a layer of high purity aluminum oxide powder on the surface of a crucible or container to avoid aluminum oxide cookies directly contacting with the crucible or container. The furnaces that can be used here include: any of muffle furnace, tunnel kiln and graphite oven.

Furthermore, all equipment, piping, containers and tools involved in the process possible of contacting with aluminum hydroxide or aluminum oxide product or intermediate products are plated with Teflon® coatings to avoid contamination except by those made of aluminum itself.

In a specific embodiment, the provides a method for mass production of high purity aluminum oxide bulk material with total impurities, including silicon, less than 0.005% and its bulk density higher than 3.0 g/cc. Details of the method are shown as below:

Step 1: With the presence of complexing agent, aluminum metal reacts with organic base in water to form aluminum hydroxide suspension at a temperature between 30 and 99° C. for a period from 1 to 100 hours. The composition of reactants is: 1-20% aluminum metal, 0.01-10% organic base, and 0.01-10% complexing agent by weight respectively. The rest is deionized water. All reactants can be introduced into water at once or one after another.

Step 2: Majority water content in the aluminum hydroxide suspension is removed by filtering to form aluminum hydroxide slurry, which is further converted into aluminum oxide by heating up to a temperature between about 500° C. and 1400° C. for a period from about 0.5 to 100 hours.

Step 3: The aluminum oxide powder is further purified by rinsing with selected cleaning solutions. The typical mass ratio between aluminum oxide to the cleaning solution is from 1:1 to 1:50. The rinsing process can be repeated up to 500 times with one cleaning solution or different cleaning solutions alternatively for a period from 10 minutes to 6 hours. Then, the aluminum oxide is separated from the cleaning solution by filtering to obtain aluminum oxide plaster. The remaining water content in the highly purified aluminum oxide plaster is typically between 1 to 40% by weight.

Step 4: Small of amount binder is added into the aluminum oxide plaster for casting. The sintering process to solidify the casted aluminum oxide is done at a temperature higher 1450° C. for a period from 0.2 hour up to 100 hours in a furnace.

In the 1$^{st}$ step, the reaction is represented as below:

$$2Al + 6H_2O \rightarrow 2Al(OH)_3 + 3H_2$$

The purity of the aluminum metal raw material is required to be higher than 99.95%. Other non-aluminum metals in the raw material are required to be less than 0.05% in total. These metal impurities include Fe, Na, K, Ca, Mn, Zn, Cu, V, Cr, Ti, Ni, Mg, particularly, Fe, Na, K, Ca, Mg, Cu, Zn, Ni. To improve the reaction efficiency, it is ideal to have small aluminum metal pieces with thickness less 2 mm and total volume of less than 6 cm$^3$, or have aluminum powder as raw material. Total metal impurity level excluding aluminum in the organic complexing agent is required to be less than 10 ppm by weight.

In the current invention, the organic base used in the reaction is quaternary ammonium base. Its molecular formula is: $R_1R_2R_3R_4N^+OH^-$. Its structure is represented as below:

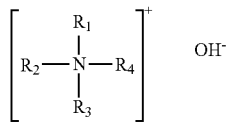

wherein $R_1$, $R_2$, $R_3$, and $R_4$ are each independently aliphatic or aromatic hydrocarbon radical.

The hydrolysis reaction is represented as follows:

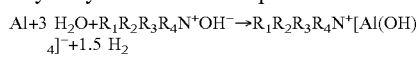

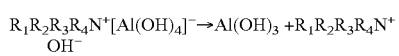

Specifically, the selected organic base is one or a mix of any of: 4-methyl ammonium hydroxide [$(CH_3)_4N^+OH^-$], 4-ethyl ammonium hydroxide [$(CH_3CH_2)_4N^+OH^-$], 4-propyl ammonium hydroxide [$(CH_3CH_2CH_2)_4N^+OH^-$], 2-hydroxyethyl) 3-methyl ammonium hydroxide [$(CH_3)_3(HOCH_2CH_2)N^+OH^-$], benzyl trimethyl ammonium hydroxide [$C_6H_5CH_2(CH_3)_3N^+OH^-$] and trimethyl phenyl ammonium hydroxide [$(CH_3)_3C_6H_5N^+OH^-$]. Total organic base consists of 0.01% to 10% of all reactants by weight.

In order to reduce non-aluminum metals impurities, certain complexing agents are selected to favorably react with those non-aluminum metal ions by forming their relevant complex compounds. Once those metal ions reacted with the complexing agents by either forming complex compounds or chelate compounds, they lose their mobility. The formation of complex or chelate compounds is an equilibrium reaction. Therefore, the logarithm value of the reaction's stability constant, lgK, can be used to determine which complex agent can be used to eliminate a specific metal ion. A higher stability constant value is more favorable to form more stable complex or chelate compound. In other words, the metal ion will not easily separate from its complexing agent once the reaction has finished. If there are several types of metal ions to be removed with one complexing agent, reactions will follow in sequence starting from higher lgK value to lower lgK value. If there are not enough complexing agent in a reaction, the lower lgK reaction may not have chance to complete the process due to insufficient amount of complexing agent. Therefore, it is important to add enough complexing agent to make sure all non-aluminum metal ions can form their own complex or chelate compounds completely.

Another possible scenario is that when multiple complexing agents are used in a solution to react with same metal ion, a higher lgK value reaction will take priority again. If a complexing agent with a lower lgK value added into the solution first and already completed its reaction, a later added complexing agent with a higher lgK value still can force the former to disassociate or release the metal ion, and allow it to react with the metal ion to form a new complex compound.

Table 1 lists four different types of complexing agents' logarithm value of reaction constant (lgK) with various metal ions.

TABLE 1

Reaction constant logarithm values of four types of complexing agents

| Metal ion | NTA (lgK) | HEDTA (lgK) | EDTA (lgK) | DTPA (lgK) |
|---|---|---|---|---|
| $Fe^{3+}$ | 15.87 | 19.87 | 25.1 | 28.6 |
| $Gd^{3+}$ | 11.54 | 15.31 | 17.10 | 22.46 |
| $Sn^{3+}$ | 11.51 | 15.39 | 16.90 | 22.34 |
| $Ce^{3+}$ | 10.83 | 14.19 | 15.80 | 20.50 |
| $Cu^{2+}$ | 13.16 | 17.55 | 18.79 | 21.10 |
| $Ni^{2+}$ | 11.54 | 17.00 | 18.56 | 20.21 |
| $Pb^{2+}$ | 11.39 | 15.50 | 18.30 | 18.60 |
| $Zn^{2+}$ | 10.66 | 14.50 | 16.69 | 18.30 |
| $Co^{2+}$ | 10.40 | 14.40 | 16.21 | 18.40 |
| $Cd^{2+}$ | 9.80 | 13.00 | 16.61 | 18.93 |
| $Fe^{2+}$ | 8.83 | 11.60 | 14.33 | 16.55 |
| $Mn^{2+}$ | 7.44 | 10.70 | 13.98 | 15.50 |
| $Ca^{2+}$ | 6.56 | 8.51 | 10.85 | 10.74 |
| $Mg^{2+}$ | 5.41 | 7.00 | 8.69 | 9.02 |
| $Sr^{2+}$ | 4.98 | 6.80 | 8.63 | 9.68 |
| $Ba^{2+}$ | 4.82 | 6.20 | 7.76 | 8.63 |

TABLE 1-continued

Reaction constant logarithm values of four types of complexing agents

| Metal ion | NTA (lgK) | HEDTA (lgK) | EDTA (lgK) | DTPA (lgK) |
|---|---|---|---|---|
| $Ag^+$ | 5.40 | | 7.30 | |
| $Na^+$ | 2.15 | | 1.66 | |

Note:
1) HEDTA—hydroxyethylene diamine tetracacetic acid; DTPA—Diethylene triamine pentaacetic acid.
2) It should be noted that the list in the table 1 is only used to explain the current invention, does not limit the protection of claims with this application.

Therefore, it is necessary to use a specific complexing agent to eliminate a particular metal impurity effectively. Hence, with many different types metal impurities co-exist in aluminum hydroxide solution, a combination of multiple complexing agents must be used simultaneously. Typically, most common metal impurities include: Fe, Na, K, Ca, Mn, Zn, Cu, V, Cr, Ti, Ni, Mg. Particularly, Fe, Na, K, Ca, Mg, Cu, Zn and Ni are carefully monitored.

One or more complexing agents can be chosen from either inorganic or organic types of the complexing agents. The metal impurities level, excluding aluminum, is required to be less than 10 PPM. Typically, its total mass used is between 0.1 to 10% of the total weight of all reactants involved including water.

In the $2^{nd}$ step, the majority water content in the aluminum hydroxide suspension is removed by filtering to form aluminum hydroxide cake, which is further converted into aluminum oxide by heating up to a temperature between 500 and 1400° C. for a period from 0.5 to 100 hours.

During the filtering process, aluminum hydroxide has accumulated behind a filter, and forms a cake-like product. A concurrent washing is performed by adding deionized water into the filtering process to remove residual organic bases and complexing agents. The typical mass ratio of the deionized water to aluminum hydroxide cake is between 1 and 50. The most of remaining water in the aluminum hydroxide is blown off by filtered pressed air.

To convert the aluminum hydroxide cake into aluminum oxide powder, the cake is placed into an alumina, mullite or cordierite container, or a crucible, to be heated up to a temperature between 500 and 1400° C. for a period from 0.5 to 100 hours. To avoid potential contamination during heating process, it is recommended to have a cover for the container. The furnaces can be used here include any of muffle furnace, tunnel kiln or graphite oven.

In the $3^{rd}$ step, the aluminum oxide powder is further purified by rinsing with selected cleaning solutions. The typical mass ratio between aluminum oxide to the cleaning solution is from 1:1 to 1:50. The rinsing process can be repeated up to 500 times with one cleaning solution or different cleaning solutions alternatively for a period from 10 minutes to 6 hours. Then, the aluminum oxide is separated from the cleaning solution by filtering to obtain aluminum oxide plaster. The remaining water content in the highly purified aluminum oxide plaster is typically between 1 to 40% by weight.

With the current disclosure, two different types of purifying methods have been employed to improve aluminum oxide's purity.

The first method is by adding selected acids, bases or salts to react with undesired metals without reacting to aluminum. It is often found that some metal impurity compounds formed during the previous steps are not soluble in water. Fortunately, because of aluminum oxide's extreme stability, it is possible and necessary to introduce some selected acids, bases or salts into the aluminum oxide powder with water, and to form new metal compounds, which are soluble in water, without reacting to the aluminum oxide itself. Subsequently, the new metal compounds can be separated from the aluminum oxide powder by filtering.

The second method is to form new water-soluble metal compounds by adding specifically selected complexing agents in the aluminum oxide powder in water. It is often also found that some metal impurity compounds formed during the previous steps are not even soluble in acid, base or salt solution mentioned in the first method. It is therefore necessary to use some special complexing agents to form new water-soluble metal compounds and allow the separation from the aluminum oxide powder by filtering.

In order to get rid of many different types of metal impurities, different cleaning methods may have to be applied to specific metal impurities. For Na and K elements, it is found that they can be washed out just with pure water due to their high solubility in water. Meanwhile, Fe, Mg and Ca elements can only be effectively washed out by acidic solution. And, Zn element can be washed out with basic solution. Therefore, different washing solutions and multiple steps are usually needed to cleaning out different metal impurities.

After removal of all non-desired metal impurities, the aluminum hydroxide cake is formed by filtering majority of the washing liquid with typical solid concentration higher than 60% by weight.

The $4^{th}$ step is the sintering process. A binder is added into the aluminum hydroxide cake for casting purpose before sintering process. The sintering temperature is typically set at 1450° C. for a period between 0.2 and 100 hours to convert aluminum hydroxide into aluminum oxide bulk product for sapphire crystal growth.

Typical sapphire crystal growth is a batch process using aluminum oxide as its raw material with a crystal growing furnace. To increase the overall sapphire manufacturing efficiency, it is needed to pack more high quality raw material as possible inside the furnace. Therefore, it is needed to have high density raw material with its shape matching the crucible used inside the crystal growth furnace to pack more raw materials in one single batch.

The binder is used to facilitate consolidation of aluminum oxide by improving the aluminum oxide's casting density before the sintering. The final sintered aluminum oxide product typically has its bulk density higher than 3 g/cc, sometime as high as 4.0 g/cc with current method. Typically, the binder selected here is water soluble organic polymer, including polyethylene glycol, polyvinyl alcohol, and other low molecular weight polypropylene glycols as well as the deionized water itself. Sometime, a mix of all above mentioned materials can be used as a formulated binder as well.

The amount of binder used typically is between 0.2% and 10% by weight.

In order to reduce secondary contamination during the final sintering process, it is desirable to place a layer of aluminum oxide powder on the crucible surface to avoid potential cross contamination. Secondly, metal impurities in the crucible material itself can be vaporized at high temperature to further contaminate the product. Therefore, a proper set of sintering temperature and duration must be selected based the requirements of reaching at least 3.0 g/cc density, less potential cross contamination and as well as good energy usage efficiency. With current disclosure, the optimized sintering process is 1450° C. with the duration between 0.2 to 100 hours.

The overall purity level is measured by measuring each individual metal elements including Na, Li, Fe, Mg, Ca, Zn and etc. by ICP method. For ICP sample preparation, 0.5 gram aluminum oxide will be dissolved into 10 ml 36.5% HCl, and then further diluted into 25 ml solution for the measurement. The sum of total non-aluminum metal impurities is used to indicate the purity of the aluminum oxide product.

The density of aluminum oxide is measured with the cup method.

In summary, the key feature of this invention is to use complexing agents to react with undesired metal elements (other than aluminum itself) to form water soluble complex compounds. Therefore, it is possible to separate aluminum compound (solid) from the other metal impurities by filtering process to reach the desired high purities. The following non-limiting examples are provided to further illustrate certain aspects of the present invention.

WORKING EXAMPLES

Example 1

With 1383.86 grams deionized water, plus 2 grams tetramethyl ammonium hydroxide, 0.14 gram $NH_4F$, and 14 grams 99.95% pure aluminum metal chips, the reaction is kept at a temperature of 95° C. for 24 hours with sufficient stir and mixing. The reacted product, aluminum hydroxide cake, is obtained by filtering out most of liquids, and is rinsed with 40.45 grams deionized water afterward. After it is dried in ambient condition, the aluminum hydroxide cake is converted into aluminum oxide powder by firing at 900° C. for 8 hours inside a crucible. Then, the aluminum oxide powder is put into a Teflon® container for washing and cleaning with 26.45 grams 1 percent ammonia water and continuously stirred and mixed for 6 hours at ambient condition. Then, the aluminum oxide is separated from majority of water by filtering. The water content is further reduced to 9.8% in the total 29.3 gram final high purity aluminum oxide plaster product after drying in a baking oven. Subsequently, 2.93 grams polyethylene glycol binder is mixed into the 29.3 gram aluminum oxide powder for casting. The casted product is then sintered at 1500° C. for 3 hours. Finally, 25.6 grams high purity aluminum oxide bulk is obtained with its density of 3.4 g/cc, and its overall metal impurity content, including silicon, less than 0.003% by weight measured by ICP method.

Example 2

With 1022 grams deionized water, plus 38 grams four-methyl ammonium hydroxide, 120 grams $NH_3$, 20 grams $NH_4SCN$, and 200 grams 99.991% pure aluminum metal chips, the reaction is kept at a temperature of 99° C. for one hour with sufficient stir and mixing. The reacted product, aluminum hydroxide cake, is obtained by filtering out most of liquids, and is rinsed with 11555.56 grams deionized water afterward. After it is dried in ambient condition, the aluminum hydroxide cake is converted into aluminum oxide powder by firing at 1400° C. for 16 hours inside a crucible. Then, the aluminum oxide powder is put into a Teflon® container for washing and cleaning with 1888 grams deionized water and continuously stirred and mixed for 10 minutes at ambient condition. This washing and cleaning process is repeated for 500 times in this example. Then, the aluminum oxide is separated from majority of water by filtering. The water content is further reduced to 7.9% in the total 410.1 gram final product with a baking oven. Subsequently, 0.041 gram polyethylene glycol binder is mixed into the 410.1 grams aluminum oxide powder for casting. The casted product is then sintered at 1520° C. for 30 hours. Finally, 375.3 grams high purity aluminum oxide bulk is obtained with its density of 3.0 g/cc, and its overall metal impurity content, including silicon, less than 0.002% by weight measured by ICP method.

Example 3

With 930 gram deionized water, plus 50 gram four-propyl ammonium hydroxide, 90 gram Three methyl phenyl hydroxide, 50 grams Ethylene glycol bis(β-two amino ethyl) ether—N, N, N', N'-four acetic acid, and 280 grams 99.99% pure aluminum metal chips, the reaction is kept at a temperature of 45° C. for 100 hours with sufficient stir and mixing. The reacted product, aluminum hydroxide cake, is obtained by filtering out most of liquids, and is rinsed with 40444.44 grams deionized water afterward. After it is dried in ambient condition, the aluminum hydroxide cake is converted into aluminum oxide powder by firing at 1050° C. for 24 hours inside a crucible. Then, the aluminum oxide powder is put into a Teflon® container for washing and cleaning with 2000 grams 1.5 percent hydrochloride aqueous solution and continuously stirred and mixed for 30 minutes at ambient condition. The step is repeated for 5 times. Then, the aluminum oxide is separated from majority of water by filtering. The water content is further reduced to 3.1% in the final product with a baking oven. Subsequently, the aluminum oxide powder is casted without adding binder. The casted product is then sintered at 1450° C. for 24 hours. Finally, 526.9 grams high purity aluminum oxide bulk is obtained with its density of 3.9 g/cc, and its overall metal impurity content, including silicon, less than 0.005% by weight measured by ICP method.

Example 4

With 1250 grams deionized water, plus 20 grams (2-hydroxyl-ethyl) tri-methyl ammonium hydroxide, 30 grams ethylene bisiminoacetic acid, 80 grams 99.993% and 20 grams 99.95% pure aluminum metal chips, the reaction is kept at a temperature of 80° C. for 10 hours with sufficient stir and mixing. The reacted product, aluminum hydroxide cake, is obtained by filtering out most of liquids, and is rinsed with 4300 grams deionized water afterward. After it is dried in ambient condition with measured water content of 25%, the aluminum hydroxide cake is converted into aluminum oxide powder by firing at 500° C. for 100 hours inside a crucible. Then, the aluminum oxide powder is put into a Teflon® container for washing and cleaning with a mix of 2777.78 grams 0.5 percent oxalic acid and 1000 grams 1% nitric acid in water, and continuously stirred and mixed for 1.5 hours at ambient condition. Then, the aluminum oxide is separated from majority of water by filtering. The water content is further reduced to 3% in the final product with a baking oven. Subsequently, the casted product without using binder is then sintered at 1650° C. for 48 hours. Finally, 188.1 grams high purity aluminum oxide bulk is obtained with its density of 3.6 g/cc, and its overall metal impurity content, including silicon, less than 0.002% by weight measured by ICP method.

Example 5

With 1043 grams deionized water, plus 70 grams benzyl tri-methyl ammonium hydroxide, 102 grams oxalic acid, 185 grams 99.98% pure aluminum metal powder, the reaction is kept at a temperature of 30° C. for 22 hours with sufficient stir and mixing. The reacted product, aluminum hydroxide cake, is obtained by filtering out most of liquids, and is rinsed with 10000 grams deionized water afterward. After it is dried in ambient condition with measured water content of less than 25%, the aluminum hydroxide cake is converted into aluminum oxide powder by firing at 1350° C. for half hour inside a crucible. Then, the aluminum oxide powder is put into a Teflon® container for washing and cleaning with 4200 grams 0.5% ammonium fluoride in water, and continuously stirred and mixed for 1.5 hours at ambient condition. In addition, the similar cleaning process is repeated three times with Ethyl-benzene cleaning agent followed with deionized water rinsing for 100 times. The water content is reduced to 30% with a baking oven. Subsequently, the casted product without using binder is then sintered at 1700° C. for 0.2 hour. Finally, 349.1 grams high purity aluminum oxide bulk is obtained with its density of 3.8 g/cc, and its overall metal impurity content, including silicon, less than 0.001% by weight measured by ICP method.

Example 6

With 1343.86 grams deionized water, plus 0.14 gram tri-methyl phenyl hydroxide, 2 grams tri-ethanolamine, 4 grams di-ethylene tri-amine pentaacetic acid, and 50 grams 99.995% pure aluminum metal chips, the reaction is kept at a temperature of 60° C. for 50 hours with sufficient stir and mixing. The reacted product, aluminum hydroxide cake, is obtained by filtering out most of liquids, and is rinsed with 2600 grams deionized water afterward. After it is dried in ambient condition, the aluminum hydroxide cake is converted into aluminum oxide powder by firing at 1200° C. for 3.5 hours inside a crucible. Then, the aluminum oxide powder is put into a Teflon® container for washing and cleaning with 380 grams 1.5% oxalic acid water based solution and 200 gram 1% Acetic acid in water, and continuously stirred and mixed for 4 hours at ambient condition. The water content is reduced to 40% in 157.4 grams final aluminum oxide cake after the filtering process. Subsequently, 0.2 gram polyvinyl alcohol and 3 grams polyethylene are added as binders for casting. The casted product is then sintered at 1580° C. for 67 hours. Finally, 93.9 grams high purity aluminum oxide bulk is obtained with its density of 3.7 g/cc, and its overall metal impurity content, including silicon, less than 0.0015% by weight measured by ICP method.

Example 7

With 1142 grams deionized water, plus 17 grams four ethyl ammonium hydroxide, 15 grams four methyl ammonium hydroxide, 25 grams (2-hydroxyethyl) tri-methyl ammonium hydroxide, 13 grams poly isocyanate, and 188 grams 99.996% pure aluminum metal chips, the reaction is kept at a temperature of 60° C. for 36 hours with sufficient stir and mixing. The reacted product, aluminum hydroxide cake, is obtained by filtering out most of liquids, and is rinsed with 1000 grams deionized water afterward. After it is dried in ambient condition, the aluminum hydroxide cake is converted into aluminum oxide powder by firing at 1100° C. for 85 hours inside a crucible. Then, the aluminum oxide powder is put into a Teflon® container for washing and cleaning with 1500 grams toluene cleaning agent, and continuously stirred and mixed for one hour at ambient condition. Then, the aluminum oxide is separated from majority of water by filtering. The water content is further reduced to 1% in the final product with a baking oven. Subsequently, the casted product without using binders is then sintered at 1520° C. for 72 hours. Finally, 354.7 grams high purity aluminum oxide bulk is obtained with its density of 3.5 g/cc, and its overall metal impurity content, including silicon, less than 0.001% by weight measured by ICP method.

Example 8

With 1183 grams deionized water, plus 11 grams four methyl ammonium hydroxide, 31 grams (2-hydroxyl-ethyl) tri-methyl ammonium hydroxide, 7 grams di-ethylene tri-amine pentaacetic acid, 5 grams poly (4-hydroxy four methylene 1,2-two carboxylic acid), 18 grams pyrophosphate, and 100 grams 99.996% pure aluminum metal chips and 45 grams 99.96% pure aluminum powder, the reaction is kept at a temperature of 75° C. for 19 hours with sufficient stir and mixing. The reacted product, aluminum hydroxide cake, is obtained by filtering out most of liquids, and is rinsed with 2500 grams deionized water afterward. After it is dried in ambient condition, the aluminum hydroxide cake is converted into aluminum oxide powder by firing at 1200° C. for 3 hours inside a crucible. Then, the aluminum oxide powder is put into a Teflon® container for washing and cleaning with 1500 grams two methyl benzene, 8000 grams 1.5% HCl aqueous solution, and 4194.44 grams 2% aqueous formic acid, and continuously stirred and mixed for 2 hour at ambient condition. The same cleaning process is repeated 25 times. Then, the aluminum oxide is separated from majority of water by filtering. The water content is further reduced to 17% in the final product with a baking oven. Subsequently, the casted product without using binders is then sintered at 1550° C. for 47 hours. Finally, 272.8 grams high purity aluminum oxide bulk is obtained with its density of 3.8 g/cc, and its overall metal impurity content, including silicon, less than 0.002% by weight measured by ICP method.

It is noted that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the present invention.

What is claimed is:

1. A method of manufacturing aluminum hydroxide, comprising the steps of:
   1) reacting an aluminum metal with an organic base in water in the presence of one or more complexing agents to form an aluminum hydroxide suspension; and
   2) removing liquid from the aluminum hydroxide suspension by filtration to obtain aluminum hydroxide;
   wherein said one or more complexing agents react with non-aluminum metal impurities in reactants of step 1) to form water soluble complexes for ease of removal in step 2).

2. The method of claim 1, wherein the aluminum metal has a purity of 99.95% or higher by weight.

3. The method of claim 1, wherein the aluminum metal is in the form of chips or powder.

4. The method of claim 3, wherein said aluminum chips are less than 2 mm in thickness with a volume smaller than 6 cm$^3$.

5. The method of claim 1, wherein the complexing agents are selected from the group consisting of organic complexing agents, inorganic complexing agents and combinations thereof.

6. The method of claim 5, wherein the inorganic complexing agents are selected from the group consisting of HCl, $NH_4SCN$, $NH_4F$, $NH_3$, polycyanic acid, polyisocyanates, pyrophosphates and polyphosphates.

7. The method of claim 5, wherein the organic complexing agents are selected from the group consisting of carboxylic acids, amino-carboxylic acids, hydroxyl amino carboxylic acids, alcohol amines, and polymers.

8. The method of claim 1, wherein the organic base is a quaternary ammonium hydroxide having a molecular formula of $R_1R_2R_3R_4N^+OH^-$, wherein $R_1$, $R_2$, $R_3$, and $R_4$ are each independently selected from alkyl, aryl, and arylalkyl, each optionally substituted by one or more substituents independently selected from the group consisting of hydroxyl and $C_1$-$C_4$ alkoxy.

9. The method of claim 8, wherein the organic base is selected from the group consisting of tetra-methyl ammonium hydroxide, tetra-ethyl ammonium hydroxide, tetra-propyl ammonium hydroxide, (2-hydroxyethyl) tri-methyl ammonium hydroxide, benzyl tri-methyl ammonium hydroxide, tri-methyl phenyl ammonium hydroxide, and combinations thereof.

10. The method of claim 1, wherein said one or more complexing agents and organic base contain, respectively, a total of less than 10 ppm of non-aluminum metal impurities by weight.

11. The method of claim 1, wherein the reaction temperature in step 1) is in the range of about 30° C. to about 99° C.

12. The method of claim 1, wherein the reaction components in step 1) have the following concentrations: about 1-20% for aluminum metal, about 0.01-10% for the organic base, and about 0.01-10% for the complexing agent by weight.

13. The method of claim 1, wherein said removing in step 2) comprises filtering the aluminum hydroxide suspension to obtain a filter cake, and washing and deliquoring the filter cake.

14. The method of claim 13, wherein said filtering is carried out on a plate-and-frame filter press, in a centrifuge, or in a bag filter, or a combination thereof; and said washing is done by using deionized water with a mass ratio between the deionized water to the solid product in the range of about 1 to 50.

15. The method of claim 13, wherein the washing comprises use of a washing liquid selected from the group consisting of deionized water, inorganic acid solutions, organic acid solutions, organic base solutions, non-metal cationic salt solutions, aliphatic hydrocarbons, aromatic hydrocarbons, alcohols, ketones, and combinations thereof.

16. The method of claim 1, wherein said purifying in step 3) comprises rinsing with one or more cleaning solutions.

17. The method of claim 1, wherein said drying in step 3) is selected from the group consisting of drying in a baking oven, drying in a toast-house, flash drying, microwave drying and a combination thereof.

18. A method of manufacturing aluminum oxide, comprising the steps of:
1) reacting an aluminum metal with an organic base in water in the presence of one or more complexing agents to form an aluminum hydroxide suspension; and
2) removing liquid from the aluminum hydroxide suspension by filtration to obtain aluminum hydroxide, and drying and dehydrating aluminum hydroxide to obtain aluminum oxide powder;
wherein said one or more complexing agents react with non-aluminum metal impurities in reactants of step 1) to form water soluble complexes for ease of removal in step 2).

19. The method of claim 18, wherein the complexing agents are selected from the group consisting of organic complexing agents, inorganic complexing agents, and combinations thereof.

* * * * *